May 3, 1966 N. M. POLLACK 3,249,372
CYLINDER VALVE OUTLET CONNECTION
Filed Dec. 30, 1963 2 Sheets-Sheet 1
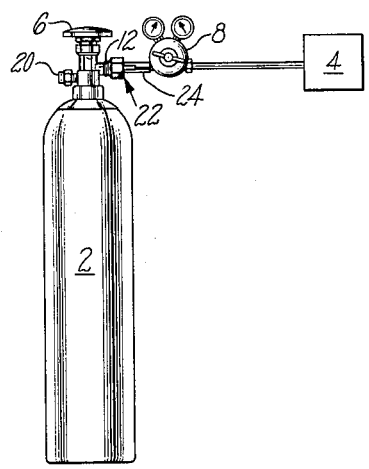
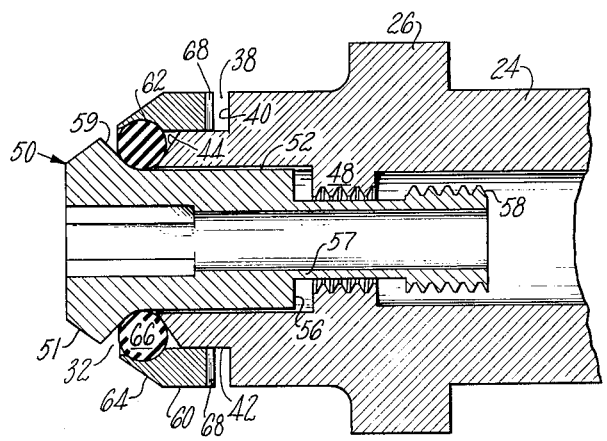
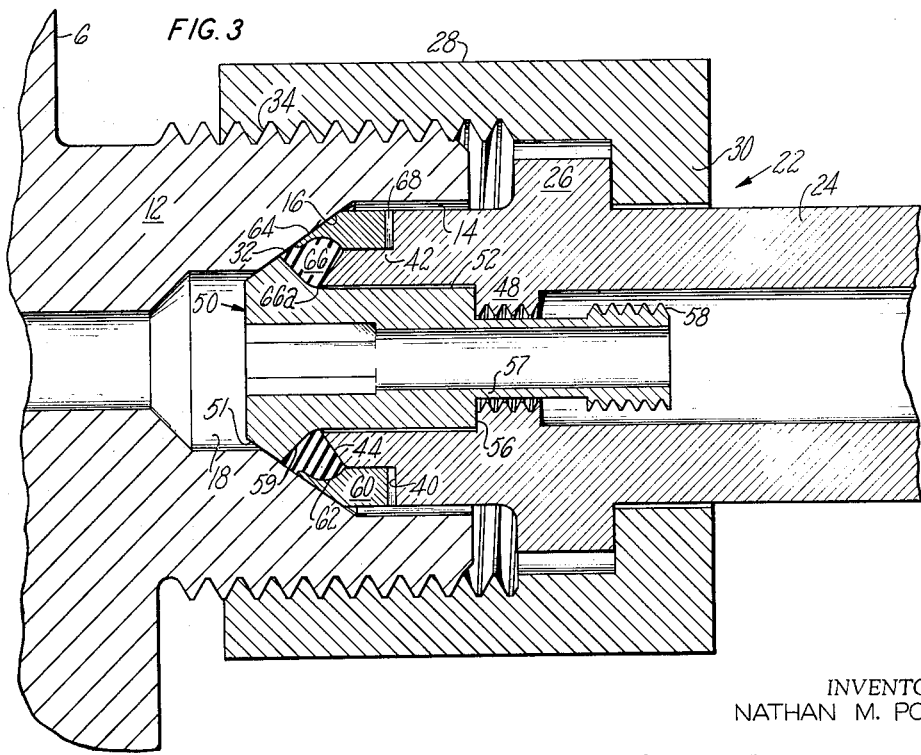
INVENTOR.
NATHAN M. POLLACK
BY Lindsey, Prutzman and Hayes
ATTORNEYS

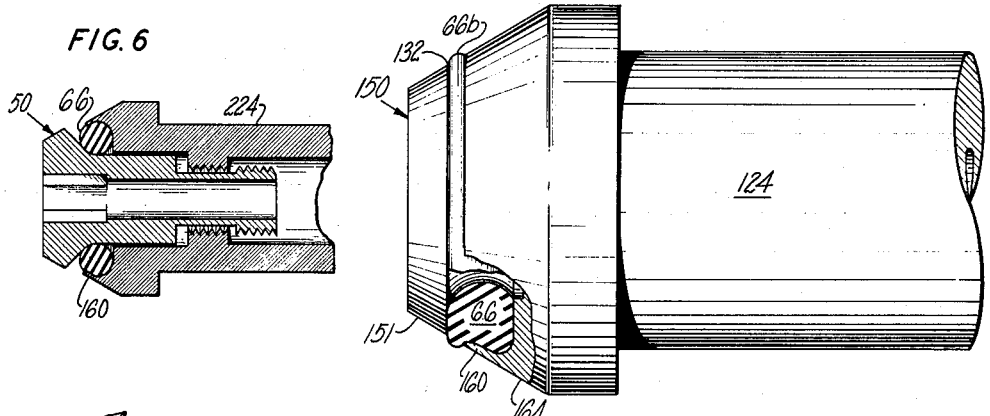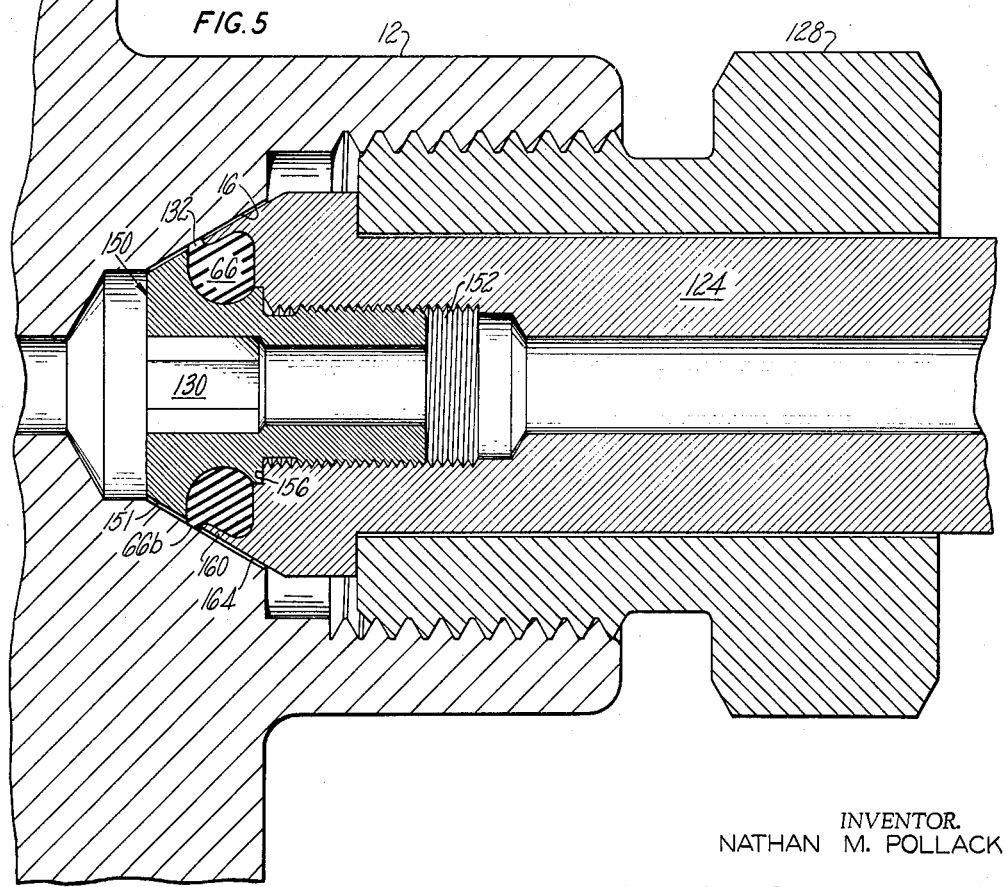

United States Patent Office 3,249,372
Patented May 3, 1966

3,249,372
CYLINDER VALVE OUTLET CONNECTION
Nathan M. Pollack, % New London Turnpike,
Marlborough, Conn.
Filed Dec. 30, 1963, Ser. No. 334,432
13 Claims. (Cl. 285—332.3)

This invention generally relates to valve outlet connections for cylinders containing gases under high pressure and more specifically to such connections utilizing resilient incompressible O-rings for sealing the gases in such cylinders.

One of the objects of the present invention is to provide an improved cylinder valve outlet connection which is easily assembled without the use of high torques and yet provides a leaf-proof seal.

A further object of the present invention is to provide an improved valve outlet connection incorporating an O-ring seal assembly which will remain caged in position on one of the parts forming the connection when the parts are disassembled in a construction in which the seal may be easily installed or replaced.

A still further object of this invention is to provide an improved cylinder valve outlet connection including a resilient incompressible O-ring which will provide positive sealing against the leakage of high pressure gases in applications which are subject to the periodical disassembly and reassembly of the connection. Included in this object is the provision of such a connection in which the metal surfaces being sealed are not scored, deformed or damaged by the assembly and disassembly of the connection.

Another object of the present invention is to provide an improved cylinder valve outlet connection incorporating a resilient and incompressible O-ring assembly which is self-aligning.

Still another object is to provide such a valve outlet connection wherein the resilient and incompressible O-ring is confined in a cage of smaller volume than that of the O-ring to cause the O-ring to protrude through a circumferential aperture in one of the sealing surfaces. Included in this object is the provision of a construction wherein the volume of the cage is decreased during assembly of the connector.

It is also an object of this invention to provide a connector including a seal assembly incorporating a cage having a removable head wherein provision is made to prevent the disassembly of the head during the disassembly of the connector.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 1 is a diagrammatic view illustrating the application of the present invention in a conventional gas cylinder application;

FIG. 2 is a fragmentary cross-sectional view of one embodiment of the seal assembly of the present invention applied to an associated valve stem;

FIG. 3 is a fragmentary cross-sectional view of the seal assembly of FIG. 2 shown as being mounted in sealing engagement with a sealing surface to form the connector of this invention;

FIG. 4 is a fragmentary view, partially broken away, of another embodiment of the seal assembly of the present invention;

FIG. 5 is a fragmentary view similar to FIG. 3 illustrating the application of the seal assembly of FIG. 4; and FIG. 6 is a fragmentary view partly broken away of another embodiment of the seal assembly of the present invention.

Referring to the drawings in detail, FIG. 1 shows an illustrative environment for the connector of this invention as including a supply tank 2 such as one containing compressed oxygen or nitrogen, an appliance 4 shown schematically, to be supplied by the tank 2, and a supply line including a cylinder shut-off valve 6 and a pressure regulator 8 connecting the supply tank 2 to the appliance 4.

As shown, the tank valve 6 is provided with a frangible pressure safety element 20 of the conventional type which is placed in communication with the interior of tank 2 and is adapted to be ruptured by excess pressure within the tank.

It will be readily apparent that in storage and shipment the closing of the valve member 6 prevents the leakage of high pressure gas from the tank 2.

In the illustrative environment of FIG. 1, the valve connection of this invention, which is generally designated as 22, is shown as being connected to the valve outlet 12 of the valve 6.

Referring now to FIG. 3, there is shown a preferred embodiment of this invention applied on an American Standard Compressed Gas Cylinder Valve Outlet Connection No. 540 or 550, in which the body of the valve 6 is provided with an integral apertured valve outlet 12 which is externally threaded. The annular re-entrant port 14 of the valve outlet 12 is provided with a frusto-conical sealing surface 16 which has an included angle of 70° and a cylindrical lower recess portion 18 which is in communication with the tank through the hollow body of the valve 6.

Referring now particularly to FIG. 2, there is shown a preferred embodiment of the seal assembly used in the connection of FIG. 3. As shown, the seal assembly is provided on the end of a nipple 24 connecting the pressure regulator 8 to the shut-off valve 6.

The end of the nipple 24 is provided with an annular shoulder 26 which is adapted to engage a coupling nut 28 having an inwardly turned annular shoulder 30 which abuts the annular shoulder 26 of the nipple. The internal bore of the coupling nut 28 is threaded to matingly engage the threaded periphery of the valve outlet 12 of the tank valve 6 as at 34 to secure the nipple 24 to the valve outlet 12.

The end of the nipple 24 is provided with an annular groove 38 having a generally radially extending wall 40 and an annular axial wall 42 and terminates in an outwardly flared annular end wall 44.

Coaxially mounted on the end of the nipple 24 within the bore thereof is an apertured movable stud nose 50. The nose 50 is provided with an intermediate shank portion 52 having an annular outer surface which is loosely positioned within the mating annular bore of the nipple 24 and is provided with a generally radial abutment wall 56 which is adapted to bottom on a radially inwardly extending annular shoulder 48 formed within the bore of the nipple 24. A second intermediate longitudinal portion 57 is provided on the nose 50. The outer periphery of the longitudinal portion 57 is unthreaded and is of a diameter so as to be loosely and freely received within the bore of the inwardly turned shoulder 48 for purposes hereinafter more fully described. The nose 50 also provides a threaded end portion 58 which matingly engages the threaded inner periphery of the shoulder 48 of the nipple 24.

The other end of the nose 50 is provided with an enlarged head providing an outwardly flared annular surface 59 which is shown as being disposed at an angle approximately perpendicular to the associated sealing surface 16 of the valve outlet 12. A second annular tapered surface 51 is formed on the end of the nose 50 with the surface 51 being disposed at an angle equal to the angle of the associated seating surface 16 of the valve outlet 12.

Positioned around the annular surface 42 of the nipple 24 is an annular retainer 60 which is guided thereby for relative longitudinal movement. Retainer 60 is provided with an internally curved recess 62 and a flared outer annular surface 64 which has a taper angle corresponding to that of surface 51 of nose 50. An annular resilient and substantially incompressible O-ring 66, formed of a material such as solid neoprene rubber or a synthetic rubber now being sold under the tradename Viton by Du Pont, is received within the annular groove 62 of retainer 60 which is of sufficient length so as to longitudinally cover the O-ring. Preferably, the relaxed over-all diameter of the O-ring 66 is slightly larger, say, 5% than the diameter of the groove 62 so that the O-ring is tightly received in groove 62. Also the outer diameter of the shank portion 52 of nose 50 preferably is slightly greater than the inner diameter of the O-ring 66 when it is assembled as shown in FIG. 2 to provide a friction force to maintain the nose 50, the retainer 60 and the O-ring 66 assembled as shown in FIG. 2.

As the seal assembly of FIG. 2 is assembled with the integral valve outlet 12 of valve 6 to form the leakproof connection of this invention, the seal assembly is inserted into the aperture 14 of the valve outlet 12 and the coupling nut 28 is threadedly engaged with the threads of the valve outlet 12. As the nut 28 is tightened onto the valve outlet 12, the tapered end surface 51 of the nose 50 and the tapered end surface 64 of retainer 60 will engage the complementary tapered sealing surface 16 of the valve outlet 12 which serves as a stop to prevent further movement between the nose 50 and retainer 60 relative to sealing surface 16. It will also be observed that nose 50, retainer 60, sealing surface 16, together with end wall 44 of nipple 24, form a cage or chamber completely enclosing and confining O-ring 66.

As the nut 28 is further tightened, the continued relative longitudinal movement of nipple 24 reduces the cross-sectional area of the cage confining the O-ring 66. During this movement, the O-ring deforms to conform to the generally triangular shape of the cage, and the tapered surfaces 59 and 44 aid in wedging the O-ring 66 toward the circumferential aperture 32 provided between the nose 50 and the retainer 60. It has been found that the width of the aperture 32 should be no more than about 40% of the relaxed cross-sectional diameter of the O-ring. Since, according to this invention, the final volume of the cage defined by the end wall 44 of the nipple 24, the retainer 60, the nose 50 and sealing surface 16 is less than the volume of the O-ring 66, and since the O-ring 66 is completely confined in the closed metal cage defined by these members, further longitudinal movement of the nipple 24 further decreases the volume. Because the O-ring 66 is readily deformable, the O-ring protrudes through the annular circumferential aperture 32 between nose 50 and retainer 60 and engages sealing surface 16. Because the O-ring 66 is incompressible, the pressure on the confined O-ring 66 rapidly increases when the volume of the cage is just equal to that of the O-ring causing the O-ring to enter into, and exactly match, any minute surface irregularities of the sealing surface 16 facing the circumferential aperture 32 since the closed metallic cage confining the O-ring prevents further deformation. The minute movement to fill these surface irregularities is the only strain imposed on the O-ring 66 when the pressure on the confined O-ring is high. Since the circumferential gap 32 through which the O-ring flows is small relative to the cross-sectional diameter of the O-ring, the sealing surface is tapered at an acute angle, and mating threads between coupling nut 28 and valve outlet 12 provides a mechanical advantage, this invention provides an arrangement in which a totally enclosed O-ring may be subjected to internal compressive forces of sufficient level to provide a leakproof connection for gases of extremely high pressure. In this regard, it has been found that the nut 28 may be tightened only finger tight to provide a leakproof connection which will withstand gas pressures of as much as 3,000 p.s.i. and more.

In the preferred embodiment of FIGS. 2 and 3, the wall 56 is spaced from tapered end wall 51 a distance so that it bottoms on the annular flange 48 after the volume of the cage is less than the volume of the O-ring. Thus, if further tightening of the coupling nut 28 should occur, the nose 50 acts as a positive stop due to the metal-to-metal contact between the surface 51 of the nose 50 and the sealing surface 16 of the valve outlet 12. Preferably, when the wall 56 of nose 50 bottoms, the retainer 60 does not bottom on surface 40 but is spaced therefrom about 6 to 12 mils to prevent crushing.

As indicated above, the nose 50 is freely and loosely positioned in the bore at the end of the nipple 24. Because of this, it is self-aligning with the sealing surface 16 despite manufacturing variations and tolerances in the fabrication of the parts of the coupling assembly. Thus, this construction provides an arrangement wherein the sealing pressure is uniform throughout the full periphery of the annular engagement between the O-ring 66 and the sealing surface 16.

If it is desired to disconnect the connector 22, the hand valve 6 is closed to prevent further discharge of high pressure gas from the tank 2. As will be apparent, however, a certain amount of gas under high pressure will be trapped in the supply line to the regulator 8. Because of the pressure exerted by this gas, it has been found to be necessary to use a wrench to turn the coupling nut 28, even though it had been tightened only finger tight.

As the nut 28 is loosened, however, the high pressure gas wil leak along the surface 52 of the nose 50 and will exert a pressure on the inner portion 66a of the O-ring 66 to deform the O-ring so that it continues to maintain sealing contact with end surface 44 of the nipple 24 and sealing surface 16 of the valve outlet to prevent the rapid release of the entrapped gas. However, because retainer 60 continues to engage sealing surface 16, the O-ring is retained in groove 62 while the gas escapes along the surfaces 40, 42 of the nipple 24.

To facilitate the rapid discharge of the entrapped gases while the nut 28 is being unscrewed, there is provided a plurality of grooves 68 on the radial wall of retainer 60. Thus, as the entrapped gases are vented as indicated above, the seal is broken and the uncoupling of the joint completed with the portions of the seal assembly, including the O-ring, being retained, ready for reuse, on the nipple 24 in the positions shown in FIG. 2.

Since the retainer 60 and the nose 50 engage the sealing surface 16, the friction therebetween tends to keep these members stationary during disassembly. Similarly, the friction between shoulder 26 and coupling nut 28 will tend to cause nipple 24 to rotate with the coupling nut 28 during disassembly of connector 22. It will be readily apparent, however, that the arrangement for mounting the nose 50 on the nipple 24 prevents the nose from being uncoupled from the nipple during disassembly since the threads on the flange 48 and the threads on the end 58 of the nose 50 do not engage during disassembly of the connector 22. Thus, this invention provides an arrangement for readily and positively securing the nose and the seal on the nipple 24 in a manner wherein it is not disassembled during the uncoupling of the connector.

Referring now to FIGS. 4 and 5, there is shown another embodiment of the invention shown as being applied to American Standard Compressed Gas Cylinder Connection 580 in which the retainer surrounding the outer periphery of the O-ring 66 is formed integrally on the nipple 124. In this embodiment, the nose 150 is provided with a threaded stem which is received within the threaded bore 152 of the nipple 124 so as to be immovably secured therein. The cage or chamber for the O-ring 66 is formed by a lip 160 integral with the end of nipple 124 and the annular groove formed on the nose 150 which are spaced to form a circumferential aperture 132. As indicated in FIG. 5, the cage for the O-ring 66 has a volume which is less than that of the O-ring itself when the nose 150 is bottomed against shoulder 156. As seen in FIG. 5, the nose 150 may be tightened so that it bottoms against shoulder 156 by the use of an Allen wrench inserted in the hexagonal bore 130.

As shown in FIG. 4, the volume of the cage for the O-ring is such that a portion of the O-ring bulges through the annular circumferential aperture 132 a distance equal to about 30 mils. When the seal assembly is secured to the nipple 124, as shown in FIG. 4, it is prepared for assembly into the valve outlet 12 of the valve 6 as shown in FIG. 5. As will be apparent, the tightening of the coupling nut 128 causes the bulging portion of the O-ring to engage the sealing surface 16 of the valve outlet. Because of the small width of the bulging portion of the O-ring and the substantially complete containment of the O-ring in a metal cage formed by nose 150 which is completely filled by the O-ring, the only significant strain imposed on the material of the O-ring are in compression and the low shear and tensile strength of the O-ring material are not exceeded in minute areas of the cross section to result in tears and permanent deformation despite the extremely high internal stresses applied to the O-ring. At the same time, by preforming a discrete bulge 66b of narrow width and limited height above the plane of tapered surfaces 151 and 164, there is a sufficient exposure of the O-ring to assure sealing. This also completely fills the cage for the O-ring so that when the bulge 66b engages the sealing surface 16, substantially the only movement of any elemental portion of the material forming the O-ring is that required to enter into and match the irregularities of sealing surface 16.

As shown in FIGS. 4 and 5, the linear width of the circumferential aperture 132 is small as compared with the relaxed cross-sectional diameter of the O-ring. It has been found that the width of aperture 132 should preferably be about 20% of the relaxed diameter of O-ring 66, and no greater than about 25%. In addition, the height of the bulge 66b should be no greater than about one-quarter the relaxed diameter of the O-ring to eliminate any significant shear and tensile forces in the assembly of the seal on the valve outlet 12. As an illustrative example, a rubber O-ring having a relaxed cross-sectional diameter of 125 mils has been found to be satisfactory when used according to the embodiment of FIGS. 4 and 5 wherein the width of aperture 132 was 25 mils and the maximum height of the bulge 66b was about 30 mils.

The embodiment of FIGS. 4 and 5 does not include vent means, operative during disassembly of the connector, for quickly releasing high pressure entrapped gas passing between threads 152 and engaging O-ring 66 to bias it out of circumferential aperture 132. It has been found that the use of a neoprene O-ring having a durometer hardness of 70 in conjunction with the use of a width of aperture 132 and height of bulge 66b which are not greater than 25% of the relaxed diameter of the O-ring will assure that it will not leave the confinement of the cage during disconnection of the connector.

FIG. 6 shows another embodiment of the invention in which the retainer encircling the outer portion of the O-ring is a lip 160 formed integrally with the nipple 224 as in the embodiment of FIGS. 4 and 5. However, the nose 50, as shown in FIG. 6, is free floating as in the embodiment of FIG. 2. Since in this design, the nose moves longitudinally relative to the nipple 224 during assembly, the cage provided by the nose and the entrant recess at the end of nipple 224 decreases in size as the coupling nut is tightened until the volume of the cage is less than the volume of the O-ring producing a seal in the same manner as in the embodiment of FIGS. 2 and 3, since this embodiment is not provided with vent means to vent the gas entrapped in the supply line prior to disconnecting the connection, and the width of the circumferential aperture is not limited as in the embodiment of FIGS. 4 and 5, its use is limited to applications in which the pressure being sealed does not exceed about 300 p.s.i.

From the foregoing, it will be apparent that the construction of this invention provides a connector suitable for gases under very high pressure in which a resilient and incompressible O-ring is utilized as a sealing element and the O-ring is so confined by a metal cage as to completely fill the metal cage prior to its engagement with the associated sealing surface so that when engagement with the associated sealing surface occurs, the material of the O-ring is subjected to substantially compressive forces while being subjected to the high pressures required for sealing, and the movement of the material forming the O-ring is only that required for the O-ring material to enter into and match the irregularities of the associated sealing surface.

As will be apparent to persons skilled in the art, various modifications and adaptations of the structure above described will become readily apparent without departure from the spirit and scope of the invention, the scope of which is defined in the appended claims.

I claim:

1. A detachable connection for high pressure gas systems comprising a first tubular member providing an internal sealing surface; a second tubular member detachable from the first tubular member and having a seal assembly secured thereto; said seal assembly comprising an internally grooved annular lip extending in a generally longitudinal direction from the end of the second tubular conduit, a readily deformable and substantially incompressible resilient O-ring mounted in the groove of said annular lip, and a separate apertured nose member removably secured within the end of said second tubular member and extending through the aperture of the O-ring, said nose member having a generally radially extending end flange overlying the end of the O-ring to form with said groove a cage for confining the O-ring; the adjacent peripheries of said flange and said lip defining a circumferential aperture facing said internal sealing surface on one side and opening into said groove on the other; and means for reducing the volume of the cage to less than the volume of the O-ring to deform the O-ring so as to completely fill the cage prior to the engagement of the O-ring through said aperture with the sealing surface of the first tubular member.

2. A detachable connection for high pressure gas systems comprising a first tubular member providing a sealing surface, a second tubular member detachable from the first tubular member and having a seal assembly mounted thereon, said seal assembly comprising an internally grooved annular lip provided at the end of the second tubular member, a readily deformable, substantially incompressible O-ring mounted in the groove of the annular lip, and an apertured nose member extending into the bore of the second tubular member and being loosely and positively secured thereto for relative axial movement, the nose member having a generally radially extending end flange overlying the end of the O-ring to form with said lip a cage for confining the O-ring, the nose member flange portion engaging the sealing surface of the first tubular member, the adjacent peripheries of said flange and said lip defining a circumferential aperture facing said internal sealing surface on one side and opening into said groove on the other, and means operable upon the assembly of the connection to move the nose member relative to the second tubular member to reduce the volume of the cage to less than the volume of the O-ring to deform the O-ring so as to completely fill the cage and to cause the O-ring to protrude through the circumferential aperture between the nose member flange and the lip and to engage the sealing surface of the first tubular member.

3. The connection as recited in claim 2 wherein the end of the nose member received within the bore of the second tubular member has a threaded end portion and unthreaded intermediate portion and the bore of the second tubular member is provided with mating threads which are out of engagement with the threads on the nose member when the seal assembly is mounted in sealing engagement with the first tubular member.

4. A detachable connection for high pressure gas systems comprising a first tubular member providing an internal sealing surface, a second tubular member detachably secured to the first tubular member and having a seal assembly mounted thereon, said seal assembly comprising an internally grooved annular retainer slidably mounted on the end of the second tubular member for relative longitudinal movement therewith, a readily deformable, substantially incompressible O-ring mounted in said groove, and an apertured nose having one end slidably positioned in the bore of the second tubular member and providing a generally radially extending nose flange on the other end thereof, the end of the annular retainer and the nose flange being spaced to form a circumferential aperture therebetween, the nose flange defining with the annular retainer and an end wall of the second tubular member a cage for confining the O-ring, the nose member and the annular retainer engaging the sealing surface of the first tubular member, and means for moving the second tubular member toward the first tubular member during the assembly thereof to reduce the volume of said cage to deform the O-ring so as to completely fill the cage and so as to protrude through the circumferential aperture into engagement with the sealing surface of the first tubular member.

5. A detachable valve connection comprising a valve outlet having an internal frustoconical sealing surface, a nipple detachably secured to the valve outlet and having a seal assembly mounted thereon, said seal assembly comprising an internally grooved annular retainer slidably mounted on a cylindrical flange on the end of the nipple for relative longitudinal movement therewith, a readily deformable, substantially incompressible resilient O-ring mounted in said groove, and an apertured nose having one end loosely and positively positioned in the bore of the nipple, said nose having a radial flange on the outer end thereof and having a frustoconical end surface for mating the sealing surface of the valve outlet, the periphery of the flange defining a circumferential aperture with the outer end of said annular retainer, said apertured nose and said annular retainer forming with the cylindrical flange on the end of the nipple a cage of variable volume for confining the O-ring, and means effective during the assembly of the nipple on the valve outlet for moving the nose into engagement with the sealing surface of the valve outlet and longitudinally relative to said nipple for reducing the volume of said cage to deform the O-ring so as to completely fill the cage and thereafter to cause the O-ring to protrude through the circumferential aperture into engagement with the sealing surface of the valve outlet.

6. A connection as defined in claim 5 wherein the movable nose and the nipple have mating shoulders adapted to engage if the tightening means is further tightened after the valve outlet and the nipple are in sealing engagement.

7. A connection as defined in claim 5 wherein the end of the nose received within the bore of the nipple has a threaded end portion and an unthreaded intermediate portion and the bore of the nipple is provided with mating threads which are out of engagement with the threads on the nose when the seal assembly is mounted on the valve outlet whereby rotation of the nipple during the uncoupling of the connection will not dissassemble the nose from the nipple.

8. A detachable connection for high pressure gas systems comprising a first tubular member providing an internal sealing surface, a second tubular member detachable from the first tubular member and having a seal assembly secured thereto, said seal assembly comprising an annular lip providing a radially inwardly directed annular groove and extending in a generally longitudinal direction from the end of the second tubular member, a readily deformable and substantially incompressible resilient O-ring mounted in said groove, a removable apertured nose member axially movably positioned within the end of the second tubular member and extending through the aperture of the O-ring, said apertured nose member having a generally radially extending flange engaging the O-ring to define with said annular lip a circumferential aperture facing said internal sealing surface and to form a cage for confining the O-ring therebetween, said nose member being so constructed and arranged that upon axial movement thereof the volume of said cage is reduced to less than the volume of the O-ring, a shoulder formed on said second tubular member and a mating shoulder formed on said nose member, and means for securing the nose member to the second tubular member with the shoulders of the nose member and the second tubular member in engagement to reduce the volume of said cage to less than that of the O-ring to deform the O-ring to completely fill the cage and to cause a portion of the O-ring to extend through the circumferential aperture and protrude above the nose member in engagement with the sealing surface of the first tubular member upon assembly of the connection.

9. The connection set forth in claim 8 wherein the width of the circumferential aperture is about 20% of the relaxed diameter of the O-ring.

10. The connection as recited in claim 9 wherein the O-ring is formed of solid neoprene rubber having a durometer hardness of about 70.

11. The device as recited in claim 9 wherein the height of the projection above the surface of the nose member is no greater than about ¼ the relaxed diameter of the O-ring.

12. A detachable connection comprising a threaded tubular member having a tapered internal sealing surface, a second tubular member having a threaded bore, said second tubular member being detachable from the first member and providing a complementary tapered end surface having a seal assembly thereon, the end portion of said seal assembly comprising an annular longitudinally extending lip providing an inwardly directed groove within the tapered end portion of the second tubular member, a readily deformable and substantially incompressible resilient O-ring mounted in said groove, and an apertured nose member having a threaded portion extending into the bore of said second tubular member and engaging the mating threads thereof, said nose member providing an outwardly directed annular groove engaging said O-ring and forming with the groove provided by said lip a cage for confining the O-ring, the nose member and second tubular member having engaging mating shoulders for controlling the distance the nose extends within the bore of the second tubular member and, upon engagement of said shoulders said nose member and said lip are spaced and define a circumferential aperture between the tapered surfaces thereof, the volume of said cage being less than the volume of said O-ring when said mating shoulders are in engagement whereby the O-ring is deformed through said aperture a distance of not more than about 25% of the relaxed cross-sectional diameter of the O-ring to engage the sealing surface of the first tubular member upon assembly of the connection.

13. A detachable valve connection comprising a valve outlet having an internal frustoconical sealing surface, a nipple detachably secured to the valve outlet and having a seal assembly mounted thereon, said seal assembly comprising an internally grooved annular retainer slidably mounted on a cylindrical flange on the end of the nipple for relative longitudinal movement therewith, a readily deformable, substantially incompressible resilient O-ring mounted in said groove, and an apertured nose having one end loosely and positively positioned in the bore of the nipple, said nose and said annular retainer having aligned frustoconical surfaces for engaging the sealing surface of the valve outlet, the periphery of the flange defining a circumferential aperture with the outer end of said annular retainer, said apertured nose and said annular retainer forming with the cylindrical flange on the end of the nipple a cage of variable volume for confining the O-ring, and means effective during the assembly of the nipple on the valve outlet for moving the frustoconical surfaces of the nose and the annular retainer into engagement with the sealing surface of the valve outlet and longitudinally relative to said nipple for reducing the volume of said cage to deform the O-ring so as to completely fill the cage and thereafter to cause the O-ring to protrude through the circumferential aperture into engagement with the sealing surface of the valve outlet.

References Cited by the Examiner

UNITED STATES PATENTS

| 2,377,891 | 6/1945 | Lane | 285—356 X |
| 2,417,494 | 3/1947 | Hoof | 285—332.3 X |

FOREIGN PATENTS 1,086,073   4/1954   France.

CARL W. TOMLIN, *Primary Examiner.*

C. B. FAGAN, S. R. MILLER, *Assistant Examiners.*